United States Patent
Uh et al.

(10) Patent No.: US 8,288,026 B2
(45) Date of Patent: Oct. 16, 2012

(54) SECONDARY BATTERY

(75) Inventors: Hwail Uh, Yongin-si (KR); Sangwoo Lee, Yongin-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 611 days.

(21) Appl. No.: 11/707,993

(22) Filed: Feb. 20, 2007

(65) Prior Publication Data

US 2007/0202393 A1 Aug. 30, 2007

(30) Foreign Application Priority Data

Feb. 27, 2006 (KR) .................. 10-2006-0018711

(51) Int. Cl.
*H01M 2/12* (2006.01)

(52) U.S. Cl. ............................ 429/53; 429/82

(58) Field of Classification Search .............. 429/56, 429/176, 175, 185, 72, 73, 74, 82, 83, 53
See application file for complete search history.

(56) References Cited

U.S. PATENT DOCUMENTS

| | | | | |
|---|---|---|---|---|
| 4,803,136 A * | 2/1989 | Bowsky et al. | ............... | 429/56 |
| 2005/0106451 A1 | 5/2005 | Kim et al. | | |
| 2005/0181272 A1 * | 8/2005 | Kim | ....................... | 429/56 |

FOREIGN PATENT DOCUMENTS

| | | |
|---|---|---|
| JP | 07-169452 | 7/1995 |
| JP | 11-297292 | * 10/1999 |
| JP | 2000-149901 | 5/2000 |
| KR | 10-2004-0022922 | 3/2004 |
| KR | 10-2005-0037689 | 4/2005 |
| KR | 10-2005-0037689 A | 4/2005 |
| KR | 10-2006-0027674 A | 3/2006 |

OTHER PUBLICATIONS

Korean Office Action corresponding to Korean Patent Application No. 2006-18711, issued on May 19, 2007.

* cited by examiner

*Primary Examiner* — Jennifer Michener
*Assistant Examiner* — Monique Wills
(74) *Attorney, Agent, or Firm* — Robert E. Bushnell, Esq.

(57) ABSTRACT

The secondary battery according to the present invention has a vent deformation accelerator which promotes the operation of a vent formed on a wide side of a can in the cap plate, a bottom side of a can or a narrow side of a can so that the vent operates at the low pressure. Therefore, a secondary battery is provided with a vent which operates at a lower pressure than the operating pressure of existing vents. Also, the vent can be formed relatively thick when the operating vent which operates at the same pressure as the operating pressure of an existing vent so that it can avoid forming a vent having a minute thickness, thereby reducing the manufacturing costs and processing time.

10 Claims, 10 Drawing Sheets

SECONDARY BATTERY

CLAIM OF PRIORITY

This application makes reference to, incorporates the same herein, and claims all benefits accruing under 35 U.S.C. §119 from an application for SECONDARY BATTERY earlier filed in the Korean Intellectual Property Office on the 27 Feb. 2006 and there duly assigned Serial No. 10-2006-0018711.

BACKGROUND OF THE INVENTION

1. Field of the Invention

The present invention relates to a secondary battery. More particularly, the present invention relates to a structure promoting venting formed in a wide side of a can to form a vent deformation accelerator that is thinner than other parts in a cap plate, a bottom area of a can, or a narrow side of a can.

2. Description of the Related Art

Generally, contrary to a primary battery that is impossible to charge, a secondary battery can be charged or discharged so that it is widely used in high tech electronic applications, such as cellular phones, laptop computers, and camcorders. Especially, a lithium secondary battery has 3.6V driving voltage that is three times higher than that of a nickel-cadmium battery or a nickel-metal hydride and is used to power electronic equipment and has a high energy density per unit weight.

The lithium secondary battery mainly uses a lithium oxide as a cathode electrode active material and uses a carbon material as a anode electrode active material. Also, a lithium secondary battery is produced in various forms, such as cylinder shaped, square shaped, and pouch shaped.

A square shaped battery includes an electrode assembly, a can containing this electrode assembly, and a cap assembly combining with this can.

An electrode assembly separator separates the cathode and anode electrode and is arranged between these two electrodes, a cathode electrode and a anode tap respectively extend out from the cathode and anode electrodes.

A can is a container of metal material, having a rectangular parallelepiped shape in a square shaped secondary battery, is formed by deep drawing. A can may form a terminal of the battery. The can material can be a suitable aluminum alloy or aluminum that are high conductivity light weight metal materials. The can serves as the container of an electrode assembly and an electrolyte, and has an open upper part to allow insertion of the electrode assembly and is sealed by a cap assembly.

The cap assembly includes a cap plate attached to the upper part of the can, an electrode terminal passing through a terminal opening and having a gasket to insulate it from the cap plate, an insulation plate arranged on a lower side of a cap plate, and a terminal plate arranged on a lower side of an insulation plate and supplying an electric current to an electrode terminal. One electrode of the electrode assembly connects to the electrode terminal electrically through an electrode tap and the terminal plate and another electrode is electrically connected to the cap plate or can through a connecting electrode tap.

On the other hand, a vent can be formed on one side of a cap plate or on one edge of a wide part of the can. This vent ensures safety of a battery by discharging an internal gas because of preferentially opening, that is separating from the can, when the internal pressure of the battery is increased through overcharging.

However, some problems of such a vent are as follows.

First of all, a vent formed in a cap plate is a thinner part of a cap plate, the thickness of the edge of the vent where one can expect separating when the internal pressure of the battery is increased through overcharging is only a number of micrometers. Accordingly, designing a secondary battery that includes a vent operating at a lower pressure than the operating pressure of existing vents has a limitation. Also, there are some problems such as requiring accurate forming operations, increasing manufacturing costs, and delaying processing time to form a vent of minute thickness. Also, when an internal pressure is increased when changing the form of the can, there are disadvantages in that it cannot ensure safety of the can effectively because it can not handle a changing pressure of an internal part of the can.

On the other hand, a vent formed in a edge of the wide part of a can is a part that is formed to contain a groove of regular depth in a shape of an open-loop of a circle, a thickness of the vent where one can expect a change when the battery has a problem of is only several tens of micrometers. Therefore, a secondary battery including a vent that operates at a lower pressure than operating pressures of existing vents has a limitation as to design. Also, to form the vent to have an accurate thickness, there are some problems such as requiring accurate forming operations, increasing manufacturing costs, and delaying processing time.

SUMMARY OF THE INVENTION

The present invention, in order to solve the above-described problems, effectively prevents danger from an explosion of a can with a sensitive reacting of the vent at a low internal pressure of the can, provides more time in manufacture processing and design of the vent, and decreases unit cost by simplifying manufacturing processes.

The present invention provides a secondary battery including: a can having one side open and including an electrode assembly; a cap assembly having a cap plate attached to the open upper side of the can; a vent arranged on a wide side surface of the can; and a vent deformation accelerator arranged on one of a narrow side of the can or on a bottom side of the can or on the cap plate, the vent deformation accelerator being thinner than other parts of the battery.

The vent is preferably arranged on a closed corner portion among four corner portions of the wide side surface of the can by the vent deformation accelerator. The vent is preferably arranged in a diagonal direction of the wide side surface of the can. The vent preferably has a shape of one of one side of an open pentagon or an open circle loop.

The shape of the vent is preferably determined according to creases produced on a corner portion of the can when transformed by internal pressure in the can. The shape of the vent is preferably one of 'Γ' or '⌐', or '└' or '⌋'.

The vent preferably includes a depressed notch.

BRIEF DESCRIPTION OF THE DRAWINGS

A more complete appreciation of the present invention and many of the attendant advantages thereof, will be readily apparent as the present invention becomes better understood by reference to the following detailed description when considered in conjunction with the accompanying drawings in which like reference symbols indicate the same or similar components, wherein.

DETAILED DESCRIPTION OF THE INVENTION

Hereinafter, exemplary embodiments of the present invention are described with reference to the accompanying drawings.

Figure 1:
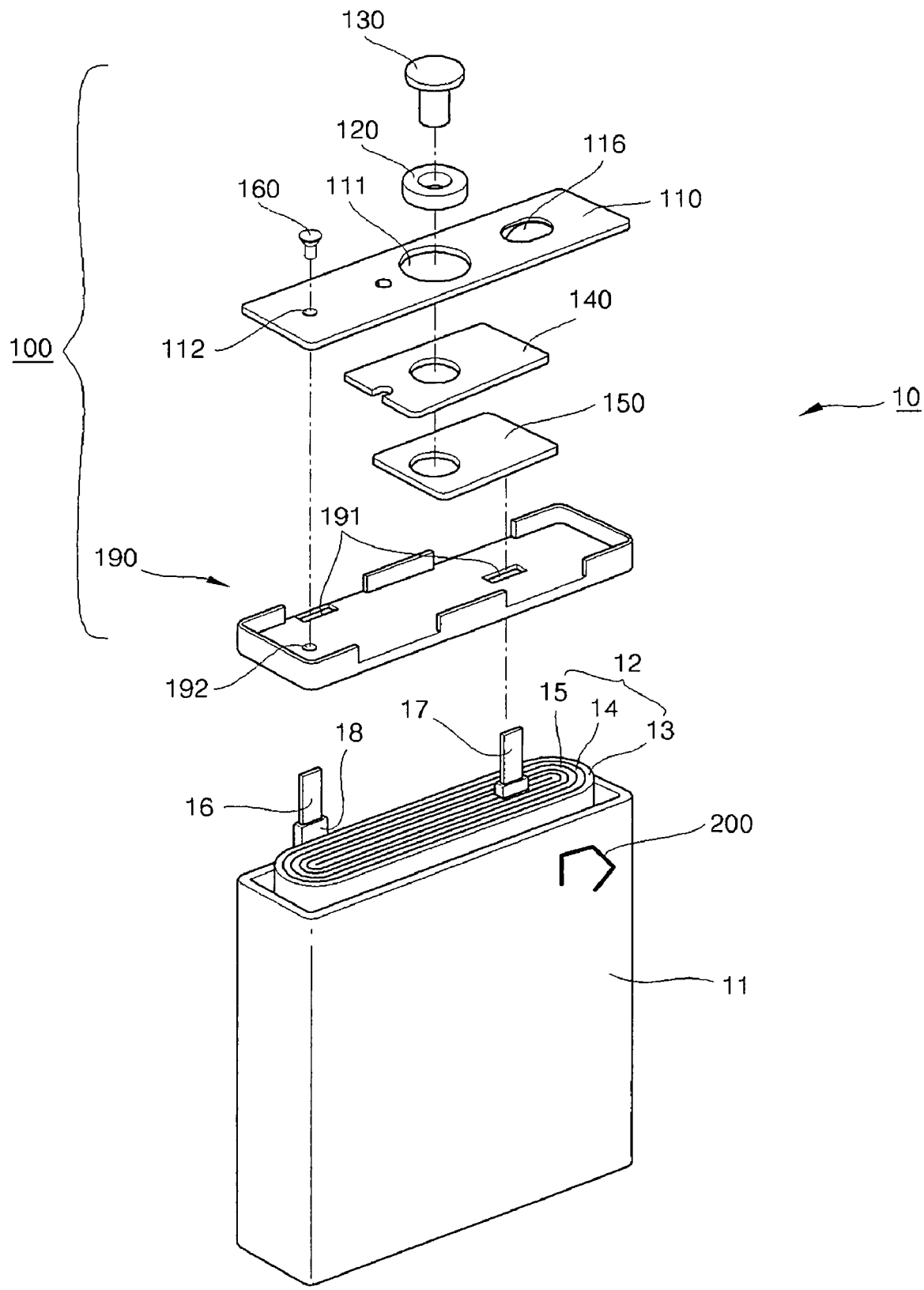
FIG. 1 is an exploded perspective view of a secondary battery of an embodiment of the present invention.

FIG. 1 is an exploded perspective view of a secondary battery of an embodiment of the present invention.

As illustrated in FIG. 1, a secondary battery 10 includes an electrode assembly 12, a can 11 containing the electrode assembly 12, and a cap assembly 100 attached to the can 11.

The electrode assembly 12 has a cathode electrode 13 and a anode electrode 15 of a wide flat shape to increase the battery capacity and a separator 14 arranged between the cathode electrode 13 and the anode electrode 15, these elements being laminated and wrapped to form a 'Jelly Roll' configuration. The anode electrode 15 and the cathode electrode 13 can be respectively formed with a carbon coating that is a anode electrode active material and a cobalt acid lithium that is a cathode electrode active material and collectors formed of a copper and aluminum foil. The separator 14 is formed of polyethylene, polypropylene, or co-polymer of polyethylene and polypropylene. The separator 14 prevents short circuits between electrode plates and is formed to be wider than the cathode electrode 13 and the anode electrode 15. The electrode assembly 12 includes a cathode electrode tap 16 and a anode electrode tap 17 that are respectively connecting to the two electrodes. The cathode electrode tap 16 and anode electrode tap 17 are wrapped with insulation tape 18 to prevent short circuits between the electrodes 13 and 15 in the border portions thereof extending outside of the electrode assembly 12.

As illustrated in FIG. 1, the can 11 is a metal material container of a rectangular parallelepiped shape and is formed by deep drawing, for example. Therefore, the can can serve as a terminal. The can material should be a light high conductivity metal, such as aluminum or an aluminum alloy. The can 11 receives the electrode assembly 12 and an electrolyte via the open upper part thereof which is sealed by the cap assembly 100. A vent 200 is formed in the wide side of the can and is described in detail later.

The cap assembly 100 includes a cap plate 110, an electrode terminal 130, an insulation plate 140, and a terminal plate 150. A terminal opening 111 is formed in the cap plate 110, an electrode terminal 130 passes through the terminal opening 111 and includes a gasket 120 to insulate it from the cap plate 110. An insulation plate 140 is arranged on the bottom side of the cap plate 110 and a terminal plate 150 is arranged on the bottom side of the insulation plate 140. The terminal plate 150 is connected to the bottom part of the electrode terminal 130.

The anode electrode 15 of the electrode assembly 12 is electrically connected to the electrode terminal 130 through the anode tap 17 and the terminal plate 150. In the case of the cathode electrode 13 of the electrode assembly 12, the cathode tap 16 is welded to the cap plate 110 or the can 11. An insulation case 190 is arranged underneath the terminal plate 150. On the other hand, a battery can be designed with a differing polarity.

A vent 116 is formed on one side of the cap plate 110 and is discussed in detail later, and an electrolyte injection hole 112 is formed on the other side of the cap plate 110 to inject an electrolyte into the can 11; a seal 160 is formed to seal the electrolyte injection hole 112 after an electrolyte has been injected.

There are various embodiments of the seal 160. For example, a ball that has larger diameter than the electrolyte injection hole 112 can be arranged at the entrance of the electrolyte injection hole 112 and after forming the seal 160 by mechanically pressing the ball into the electrolyte injection hole 112, the electrolyte injection hole 112 can then be sealed by welding through the edge of the seal 160. Also, after covering the top of the electrolyte injection hole 112 with a thin sealing plate that is larger than the electrolyte injection hole 112, the electrolyte injection hole 112 can be sealed by welding through the edge of the sealing plate.

A vent 200 is formed on the wide side of the can 11 and a vent deformation accelerator 116 formed on one side of the cap plate 110 to improve the operation of the vent 200.

Figure 2A:
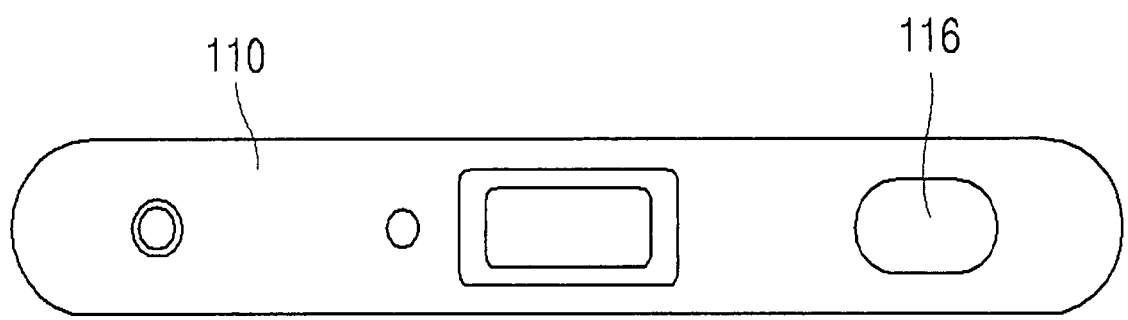
FIGS. 2A and 2B are respectively a plane figure and a sectional drawing of a cap assembly of the secondary battery of FIG. 1.
Figure 2B:
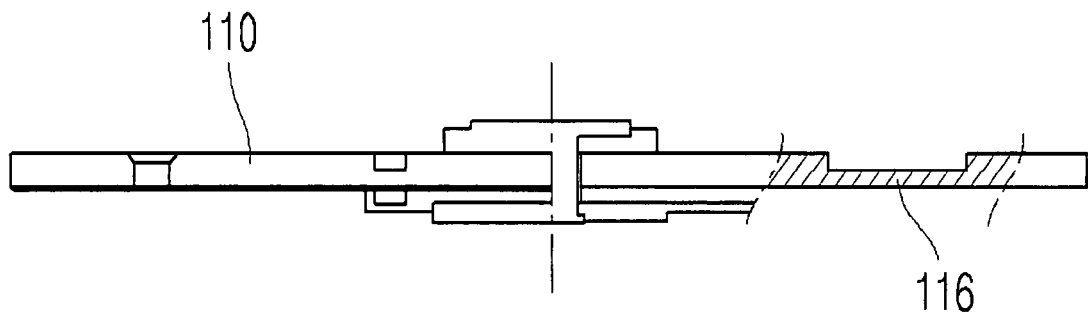
Figure 3:
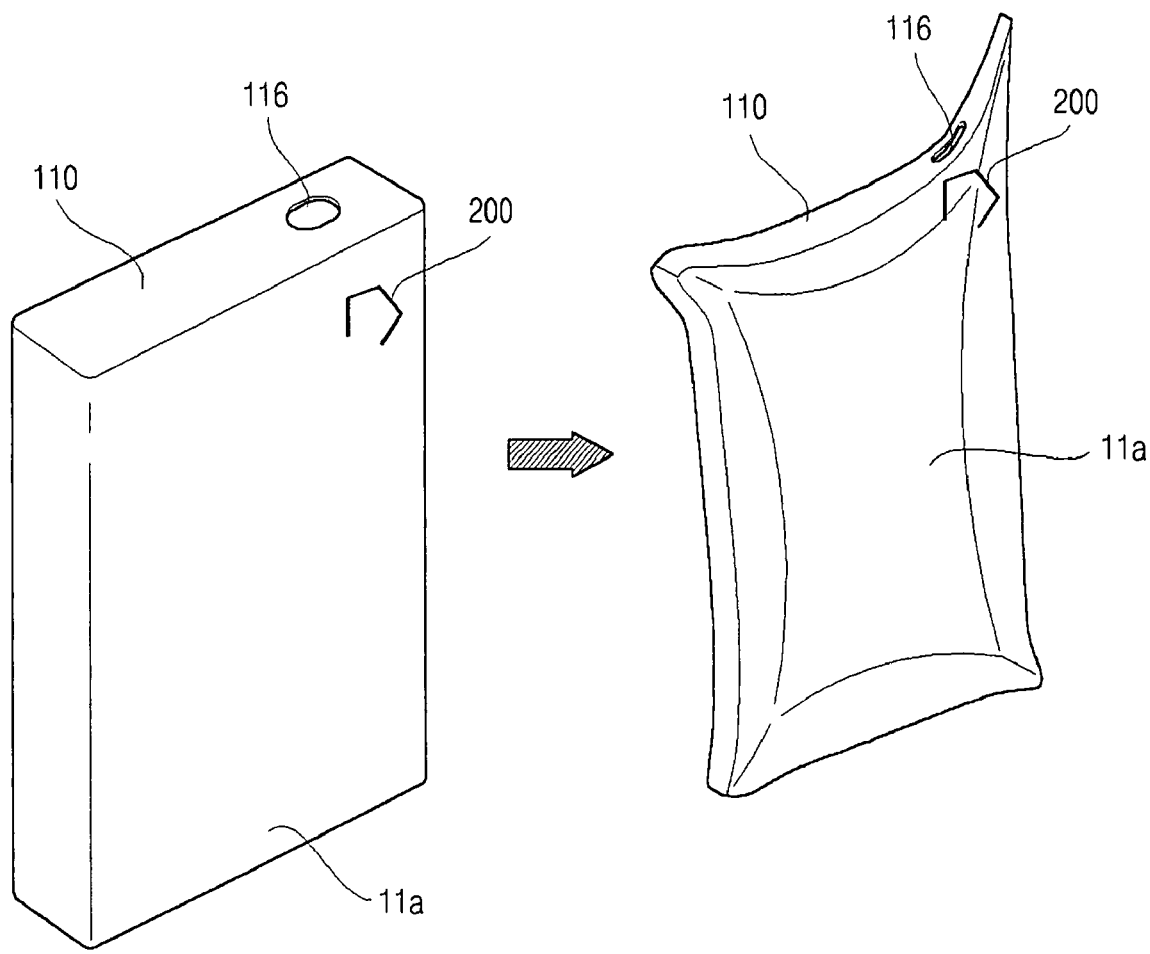
FIG. 3 is a view of a secondary battery before and after swelling thereof.
Figure 4:
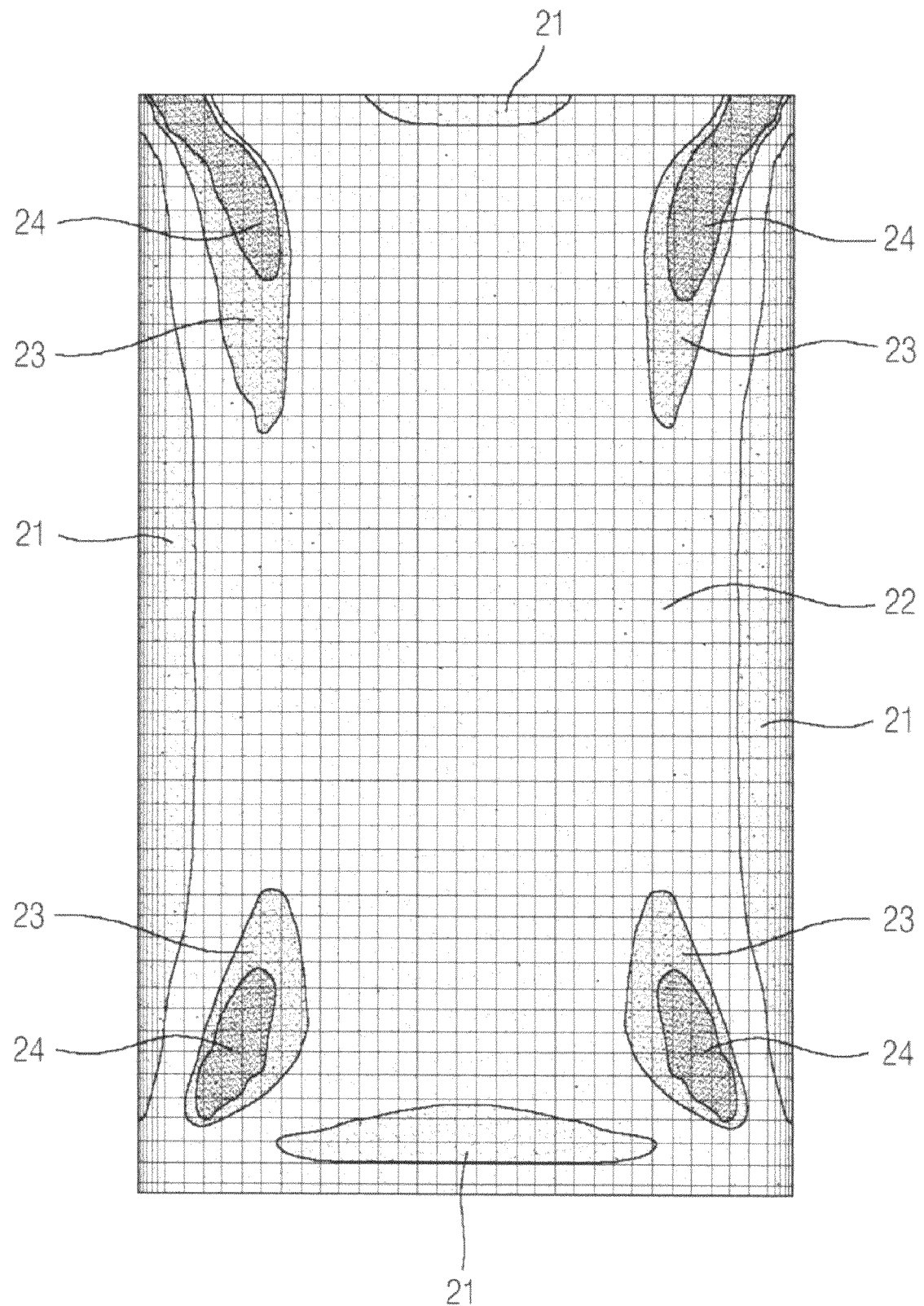
FIG. 4 is a tension stress distribution drawing of a wide side of the can, the stress being caused by an internal pressure of the can.
Figure 5A:
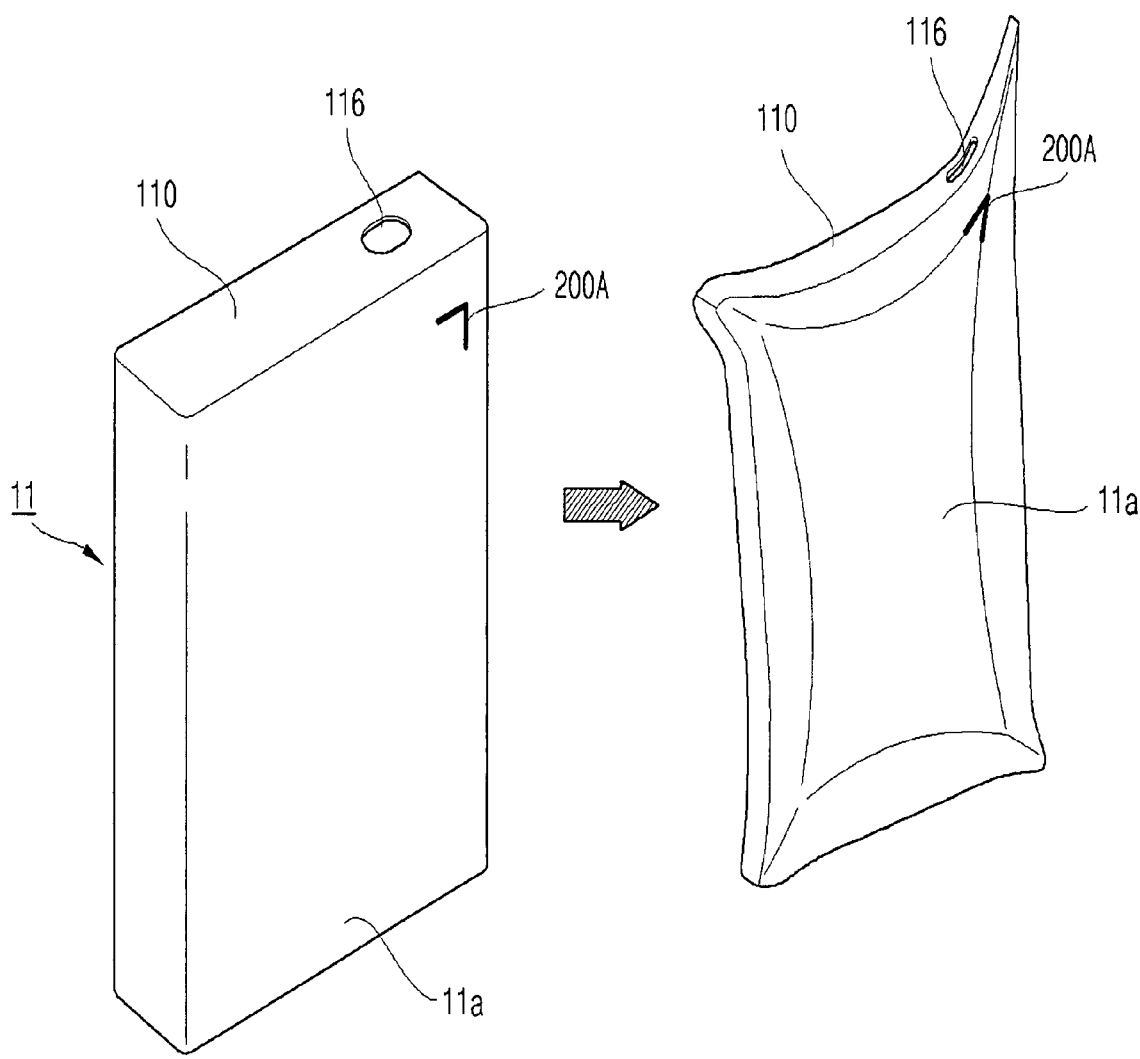
FIGS. 5A to 5D are perspective views of before and after swelling of a secondary battery of another embodiment of the present invention.
Figure 5B:
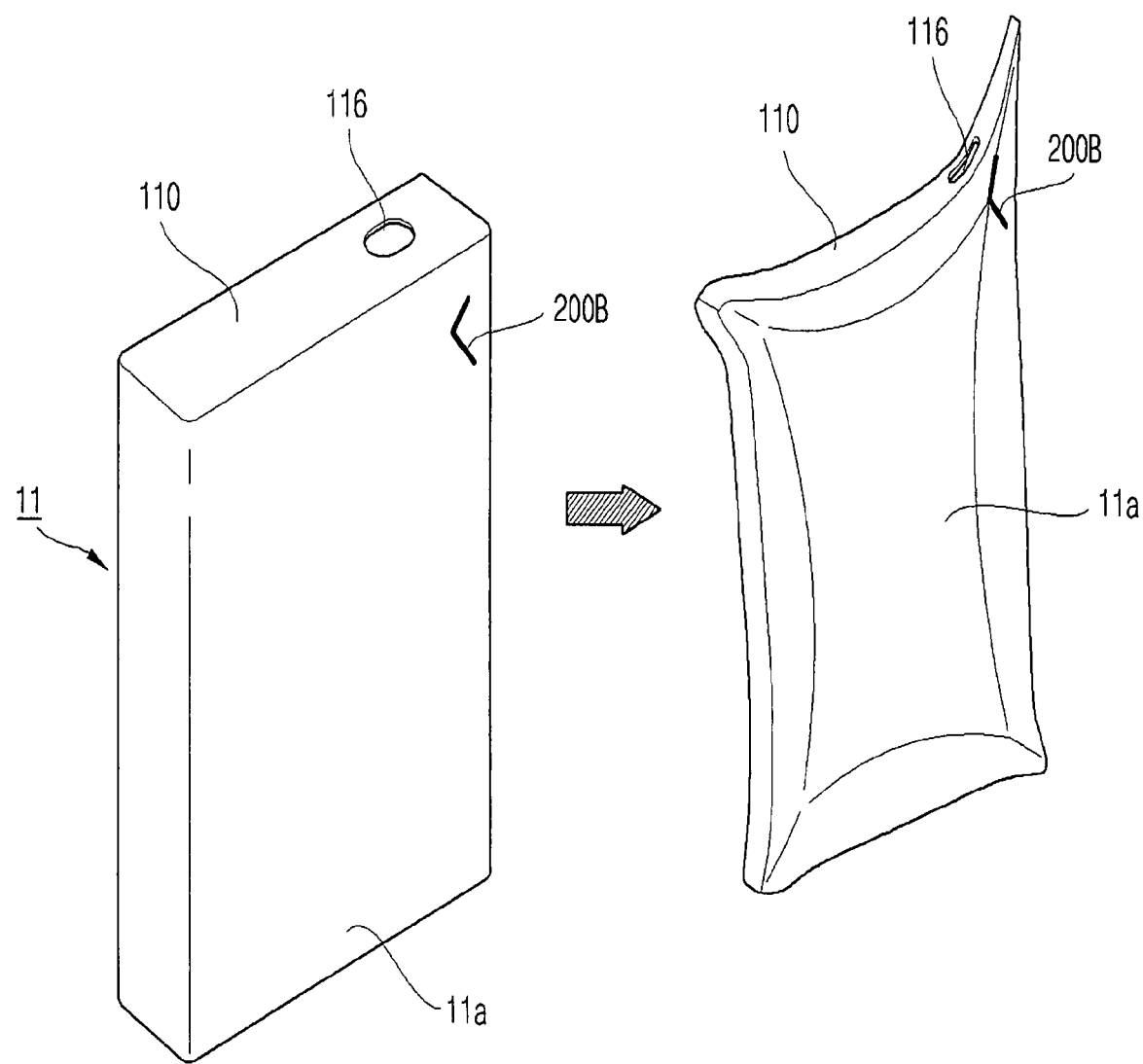
Figure 5C:
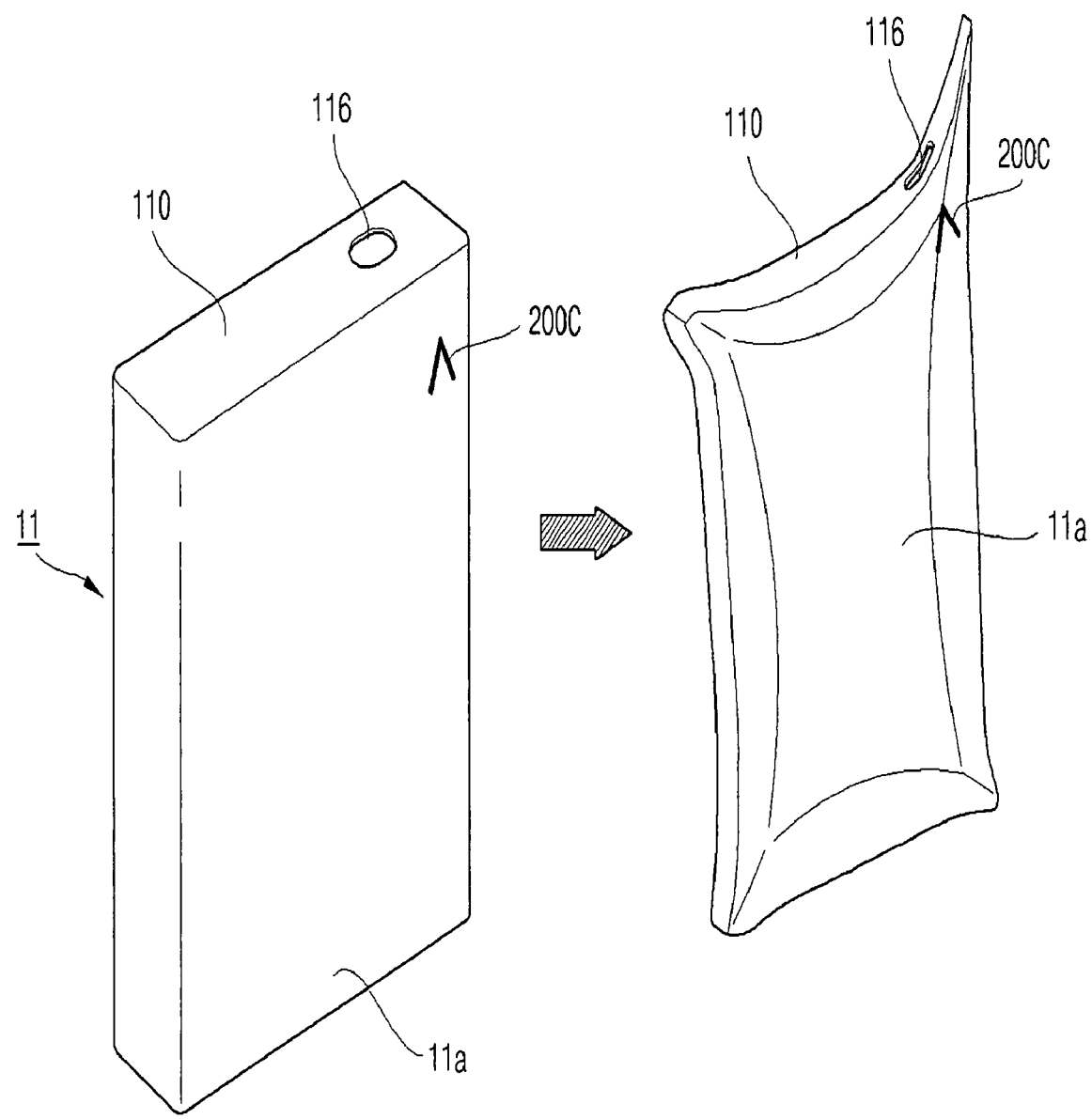
Figure 5D:
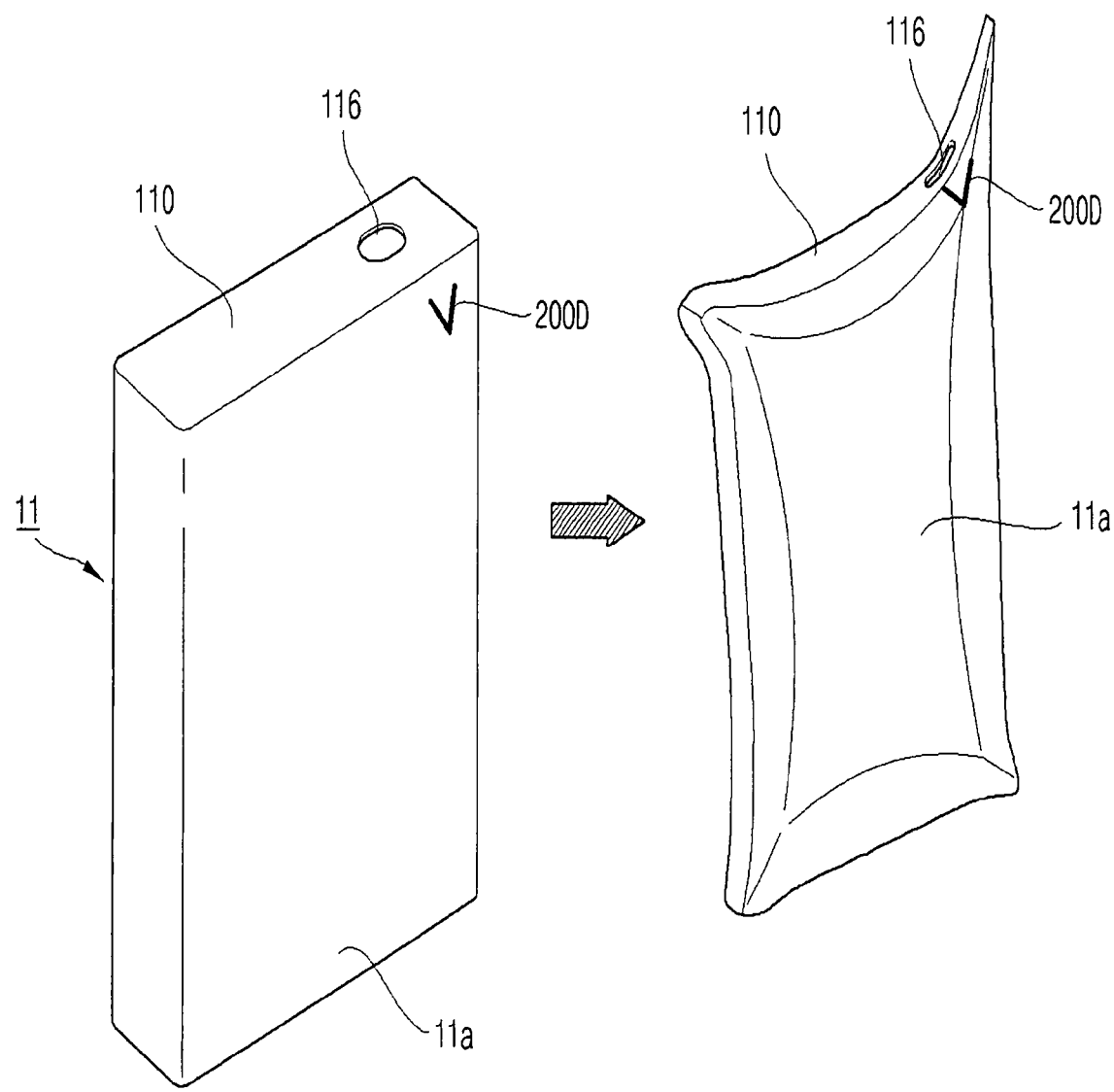

FIGS. 2A and 2B are respectively a plane figure and a sectional drawing of a cap assembly of the secondary battery of FIG. 1. FIG. 3 is a view of a secondary battery before and after swelling thereof. FIG. 4 is a tension stress distribution drawing of a wide side of the can, the stress being caused by an internal pressure of the can.

As illustrated in FIG. 3, according to an embodiment of the present invention, the vent 200 is formed on the wide side 11a of the can 11 and the vent deformation accelerator 116 that is thinner than other parts is formed on one side of the cap plate 110.

In this case, the vent 200 gets to open ahead of the vent deformation accelerator 116 due to the internal pressure of a can. Namely, the opening pressure of the vent 200 is lower than the opening pressure of the vent deformation accelerator 116.

The vent 200 can secure the safety of a battery through releasing the internal gas by opening preferentially rather than other parts rupturing when the pressure is increased by the internal gas of the battery through overcharging.

The production of gas in the can is because of the carbonic acid lithium ($Li_2CO_3$) that is used for forming a cathode electrode active material, such as cobalt acid lithium ($LiCoO_2$). Excess carbonic acid lithium remains in the cobalt acid lithium cathode electrode active material without reacting and after that, carbonic acid is produced by the carbonic acid lithium when the battery voltage is high and heat is emitted due to overcharging. A swelling in the can occurs by the produced carbonic acid gas and the vent 200 opens and lets out the internal gas out if the swelling is serious.

The swelling can be solved if a lesser amount of carbonic acid lithium remains. Currently, too much carbonic acid lithium remains because cobalt oxide ($CoO_2$) still remains in the cathode electrode active material, corrodes both electrodes, and flows out to the electrolyte during charging that results in cobalt extraction at the anode electrode and results in more danger by causing an internal short circuit.

As illustrated in FIG. 4, a tension stress distribution drawing of the wide side 11a of a swelling can (the can has a 48.7 mm long side and a 33.8 mm short side) due to internal gas, the tension stress is increased on an edge of the can 21, a flat part 22, a first edge 23, and a second edge 24. Namely, large tension stresses occur in the edges 23 and 24 when the can is swelling due to the pressure of the internal gas.

Comparing FIG. 3 with FIG. 4, the edges 23 and 24 that have very large tension stresses in FIG. 4 correspond to the near edges where three creased lines meet in FIG. 3 due to swelling.

The vent 200 is formed very close to the edge by the vent deformation accelerator 116 among creased four edge parts when the can expands due to internal pressure. As illustrated in the tension stress distribution drawing of FIG. 4, the reason that it is formed by the edge is because the tension stress is high there, and the reason that it is formed very close to the edge by the vent deformation accelerator 116 is that because the vent deformation accelerator 116 is thinner than other parts of the swelling cap plate 110.

As illustrated in FIG. 3, the vent deformation accelerator 116 is formed on the right side of the cap plate 110 that is formed on the upper side of the battery, the vent 200 is formed on the right upper edge of the wide side 11a of the can 11 by the vent deformation accelerator 116.

Therefore, the vent deformation accelerator 116 changes before other parts of the cap plate 110 due to the increasing in the internal pressure causing swelling, the tension stress being highest at the upper right edge the wide side 11a of the can 11. According to this, as illustrated in FIG. 3, the upper right edge of the battery changes more than the other parts of the battery.

The vent 200 is vertically formed in a diagonal direction on the wide side 11a of the can. Namely, the vent 200 is formed to vertically cross the wrinkle in a diagonal direction of the can which is formed when the can expands due to internal pressure. For example, the vent can be formed as one side of an open pentagon or circle shaped open loop.

A vent can be formed to correspond to wrinkle formed at the edges when a can changes due to internal pressure as show in the FIGS. 5A to 5D. A vent can be formed '⌐'-type (200A), '⌐'-type (200B), 'Γ'-type (200C), or '⌐'-type (200D) when a wide side of a can looks toward the front side. Likewise, in case the shape of a vent corresponds to a wrinkle, a vent can be effectively open.

Also, a vent can be formed as a notch. A vent can be formed by a regular depth groove with a notch using etching, electronic molding, or pressing. In this case, when a notch is formed by etching, electronic molding, or pressing, occurring pressure error or inferiority of operation distribution should not occur when it separates by internal pressure with regular the shape or depth. A vent formed by notch can be opened easily by internal pressure of inside of a can.

Also, even though this embodiment shows a vent deformation accelerator 116 in the shape of an oval, the present invention is not limited thereto and can be applied to a vent deformation accelerator 116 of various shapes.

Figure 6:
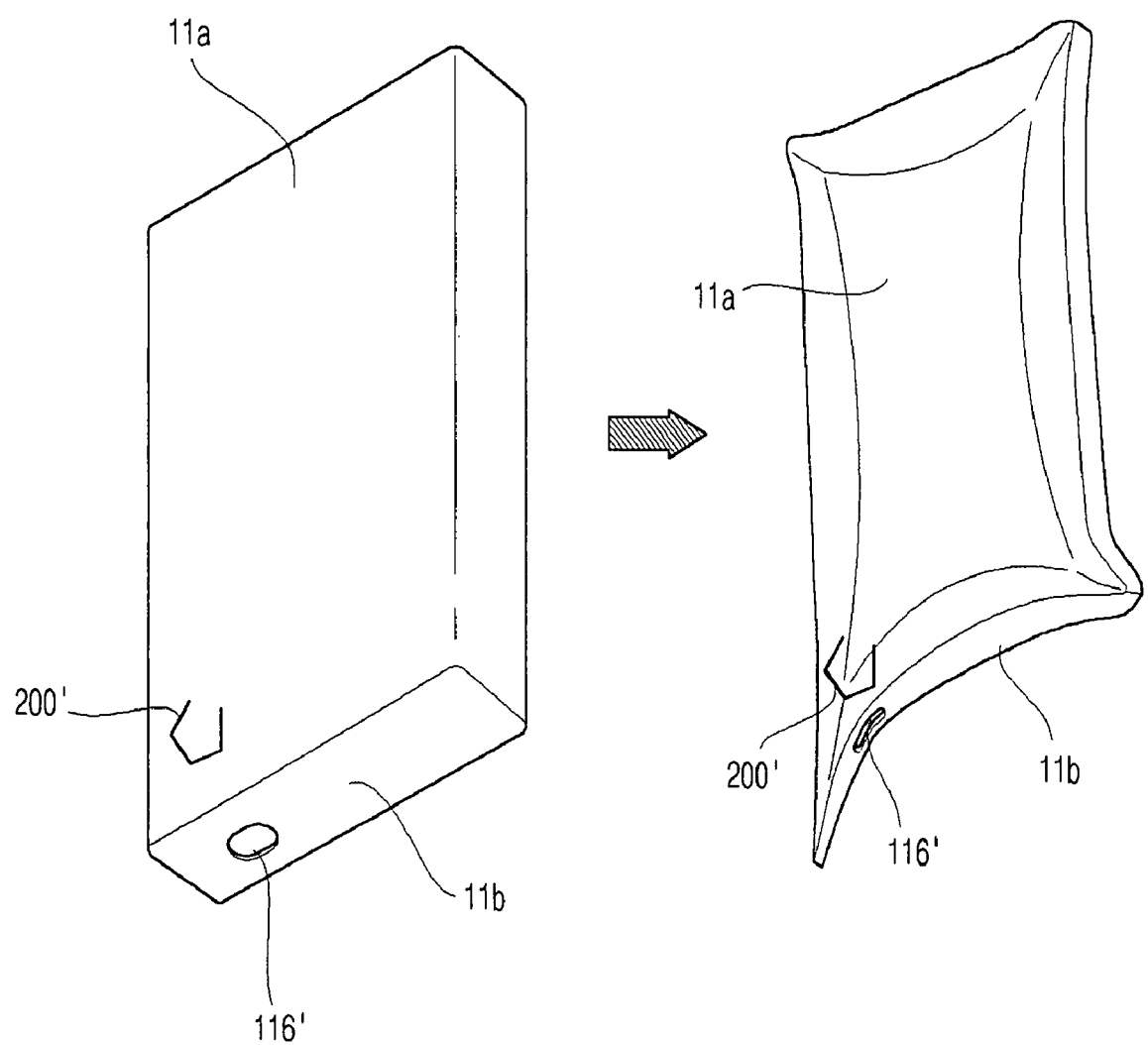
FIG. 6 is a view of a secondary battery of another embodiment according to the present invention before and after swelling thereof.

FIG. 6 is a view of a secondary battery of another embodiment of the present invention before and after swelling.

As illustrated in FIG. 6, a vent deformation accelerator 116' is formed in the left side of the bottom side 11b of a can; the vent deformation accelerator 116' is thinner than the rest of the bottom side 11b of the can and therefore changes first when the battery is swelling, and from this change, a tension stress that is bigger than that of other edges is applied to the vent 200' formed on the left bottom part. As illustrated in FIG. 6, the left and bottom side of the battery changes more than other parts of the battery.

Figure 7:
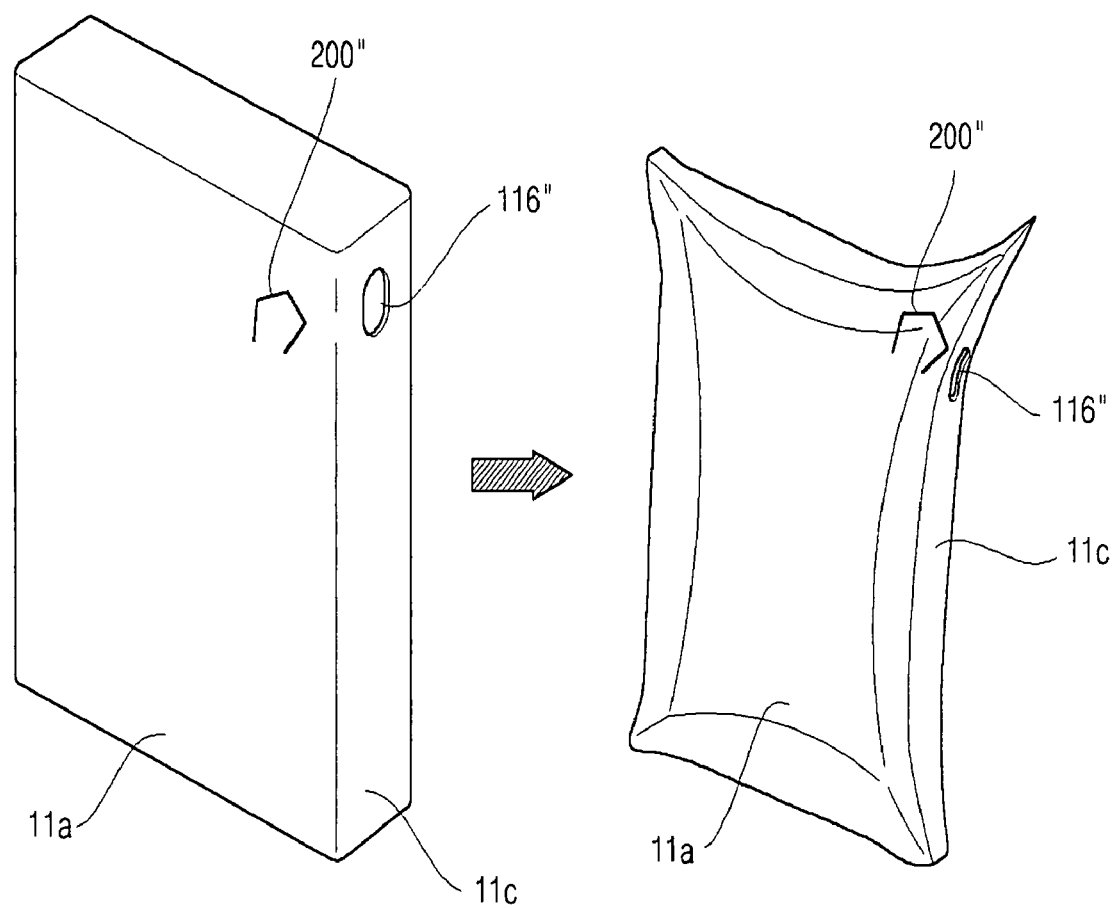
FIG. 7 is a view of a secondary battery of still another embodiment according to the present invention before and after swelling thereof.

FIG. 7 is a view of a secondary battery of still another embodiment according to the present invention before and after swelling thereof.

As illustrated in FIG. 7, a vent deformation accelerator 116" is formed on the upper part of a narrow side 11c of the can; the vent deformation accelerator 116" is thinner than the rest of the bottom side 11b of the can and therefore changes first when the battery is swelling, and from this change, a tension stress that is bigger than that of other parts is applied to a vent 200" formed on the left bottom part. As illustrated in FIG. 7, the left bottom side of a battery changes more than other parts of the battery.

The secondary battery according to the present invention lets a vent operate at a low pressure to form a vent deformation accelerator that promoted operation of a vent formed in the wide side of a can in the cap plate or bottom side or narrow side of a can. Therefore, a secondary battery including a vent that operates at a lower pressure than existing vent operation pressures can be provided.

What is claimed is:

1. A secondary battery comprising:
   a can having one side open and including an electrode assembly;
   a cap assembly having a cap plate attached to the open upper side of the can;
   a vent arranged on a wide side surface of the can; and
   a vent deformation accelerator, separate from the vent, and thinner than other parts of the battery and arranged on one of a narrow side of the can or on a bottom side of the can or on the cap plate;
   wherein the vent is arranged on a closed corner portion among four corner portions of the wide side surface of the can, the closed corner portion being the closest corner portion to the vent deformation accelerator, the vent opening at a lower internal battery pressure than the vent accelerator.

2. The secondary battery as claimed in claim 1, wherein the vent is arranged in a diagonal direction of the wide side surface of the can.

3. The secondary battery as claimed in claim 2, wherein the vent has a shape of an open pentagon.

4. The secondary battery as claimed in claim 1, wherein the shape of the vent is determined according to creases produced on a corner portion of the can when transformed by internal pressure in the can.

5. The secondary battery as claimed in claim 2, wherein the shape of the vent is one of '⌐' or '⌐', or 'Γ' or '⌐'.

6. The secondary battery as claimed in claim 1, wherein the vent comprises a depressed notch.

7. The secondary battery as claimed in claim 2, wherein the vent comprises a depressed notch.

8. The secondary battery as claimed in claim 3, wherein the vent comprises a depressed notch.

9. The secondary battery as claimed in claim 4, wherein the vent comprises a depressed notch.

10. The secondary battery as claimed in claim 5, wherein the vent comprises a depressed notch.

* * * * *